(12) United States Patent
Tagami

(10) Patent No.: US 9,442,044 B2
(45) Date of Patent: Sep. 13, 2016

(54) VEHICLE TEST SYSTEM

(71) Applicant: JTEKT CORPORATION, Osaka-shi, Osaka (JP)

(72) Inventor: Masaharu Tagami, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 74 days.

(21) Appl. No.: 14/256,636

(22) Filed: Apr. 18, 2014

(65) Prior Publication Data

US 2014/0318229 A1 Oct. 30, 2014

(30) Foreign Application Priority Data

Apr. 26, 2013 (JP) ................................. 2013-094083

(51) Int. Cl.
*G01M 17/007* (2006.01)
*G01M 17/04* (2006.01)
*G01M 17/06* (2006.01)

(52) U.S. Cl.
CPC ........... *G01M 17/007* (2013.01); *G01M 17/04* (2013.01); *G01M 17/06* (2013.01)

(58) Field of Classification Search
CPC .. G01M 17/007; G01M 17/04; G01M 17/06; G01M 7/06; G01M 13/027
USPC ...................................... 73/117.01
See application file for complete search history.

(56) References Cited

U.S. PATENT DOCUMENTS

| | | | | |
|---|---|---|---|---|
| 4,263,809 A | * | 4/1981 | Petersen | G01M 13/027 73/116.01 |
| 5,111,685 A | * | 5/1992 | Langer | G01M 17/0074 73/118.01 |
| 5,942,673 A | * | 8/1999 | Horiuchi | G01M 17/007 73/11.04 |
| 6,503,319 B1 | | 1/2003 | Courage et al. | |
| 7,054,727 B2 | * | 5/2006 | Kemp | G01M 17/007 280/5.5 |
| 7,058,488 B2 | * | 6/2006 | Kemp | G01M 17/007 701/29.1 |
| 7,971,486 B2 | * | 7/2011 | Melz | G01M 7/06 73/11.04 |
| 8,881,585 B2 | * | 11/2014 | Preising | G01M 17/007 73/115.07 |
| 8,955,397 B2 | * | 2/2015 | Saari | G01L 5/0052 73/862.381 |

(Continued)

FOREIGN PATENT DOCUMENTS

DE 10 2011 120171 A1 6/2012
JP A-2000-512610 9/2000

(Continued)

OTHER PUBLICATIONS

Bernzen, Werner, "Active Vibration Control of Flexible Robots Using Virtual Spring-damper Systems," Journal of Intelligent and Robotic Systems, (1999) vol. 24, pp. 69-88.

(Continued)

*Primary Examiner* — Freddie Kirkland, III
(74) *Attorney, Agent, or Firm* — Oliff PLC

(57) ABSTRACT

In a vehicle test system, a displacement degree computing unit computes degrees of six-degree-of-freedom displacements of each of second motion bases, which correspond to external forces of respective six degrees of freedom detected by a corresponding one of six-axis force sensors, on an assumption that each of the second motion bases has a virtual mechanical impedance. A MB second target value generator generates final position and posture target values for each of the second motion bases based on the position and posture target values for each of the second motion bases and the degrees of six-degree-freedom displacements of each of the second motion bases.

8 Claims, 9 Drawing Sheets

(56) References Cited

U.S. PATENT DOCUMENTS

| | | | | |
|---|---|---|---|---|
| 2003/0230137 | A1* | 12/2003 | Kemp | G01M 17/007 73/116.01 |
| 2004/0230394 | A1* | 11/2004 | Saari | G01M 7/06 702/113 |
| 2005/0145034 | A1* | 7/2005 | Lenzen | B66F 7/10 73/669 |
| 2007/0256484 | A1 | 11/2007 | Imanishi et al. | |
| 2007/0260438 | A1 | 11/2007 | Langer et al. | |
| 2013/0104670 | A1 | 5/2013 | Saari et al. | |
| 2014/0318229 | A1 | 10/2014 | Tagami | |
| 2014/0318264 | A1* | 10/2014 | Tagami | G01M 17/007 73/788 |

FOREIGN PATENT DOCUMENTS

| | | |
|---|---|---|
| JP | A-2006-138827 | 6/2006 |
| JP | A-2008-175778 | 7/2008 |
| JP | 2009-220184 A | 10/2009 |
| JP | A-2009-536736 | 10/2009 |
| WO | 2013/059547 A1 | 4/2013 |

OTHER PUBLICATIONS

Hogan, Neville, "Impedance Control: An Approach to Manipulation," Journal of Dynamic Systems, Measurement, and Control, Mar. 1985 vol. 107, pp. 1-24.

Oct. 24, 2014 Extended European Search Report issued in European Patent Application No. 14 16 5588.

Oct. 24, 2014 Search Report issued in European Application No. 14165586.

U.S. Appl. No. 14/256,316, filed Apr. 18, 2014 in the name of Tagami et al.

Jan. 15, 2016 Office Action issued in U.S. Appl. No. 14/256,316.

May 6, 2016 Office Action issued in U.S. Appl. No. 14/256,316.

* cited by examiner

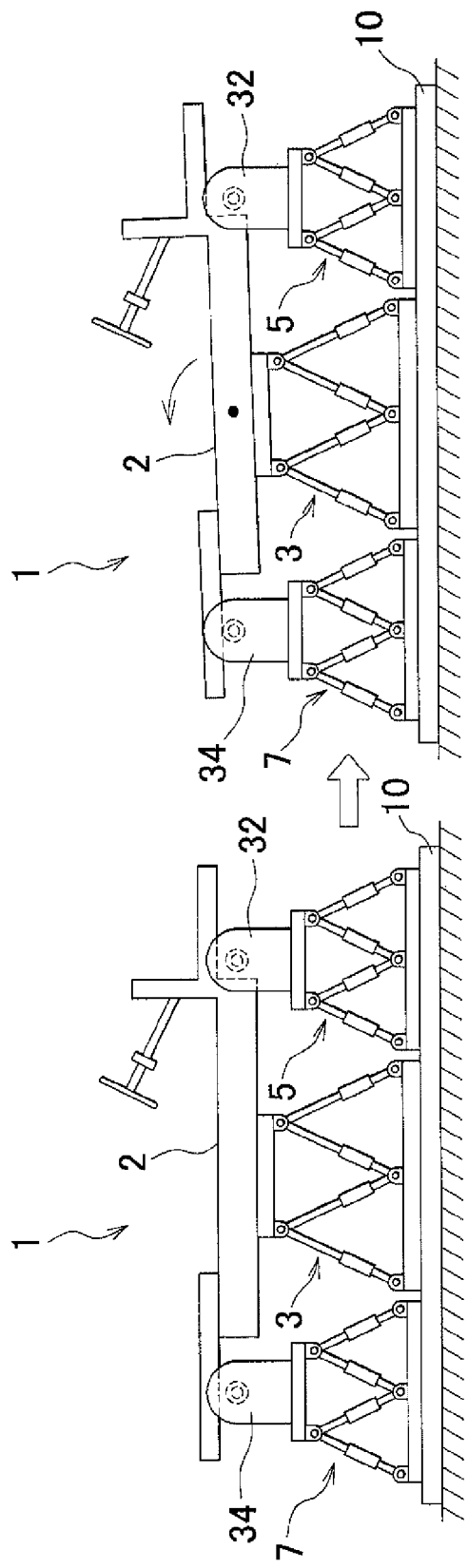

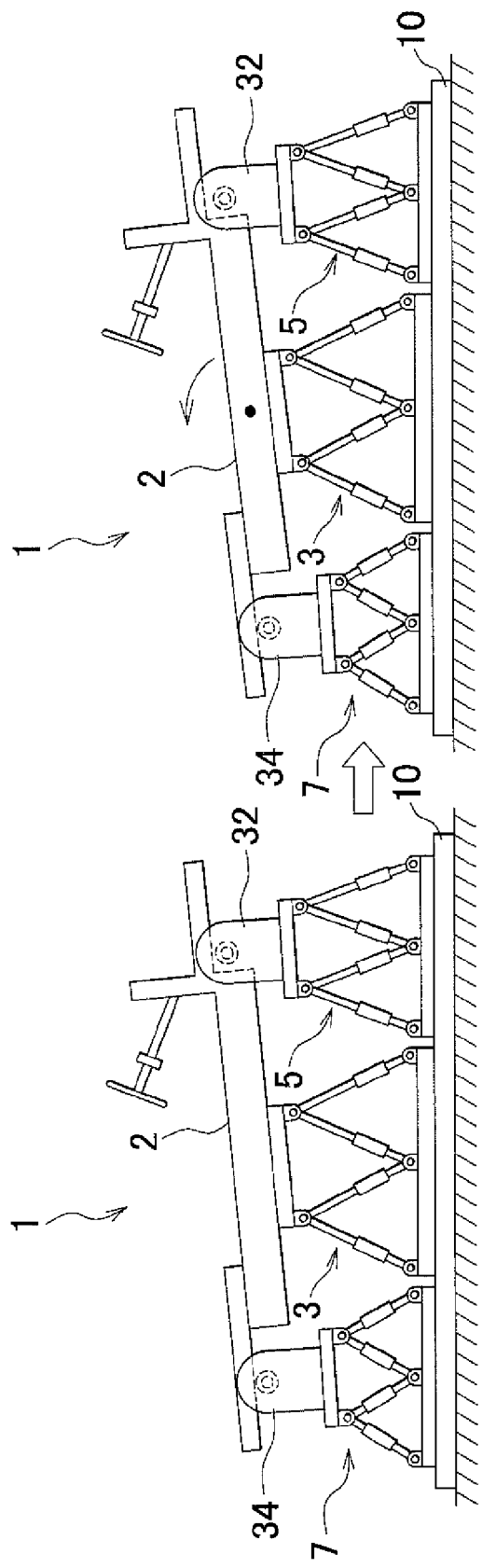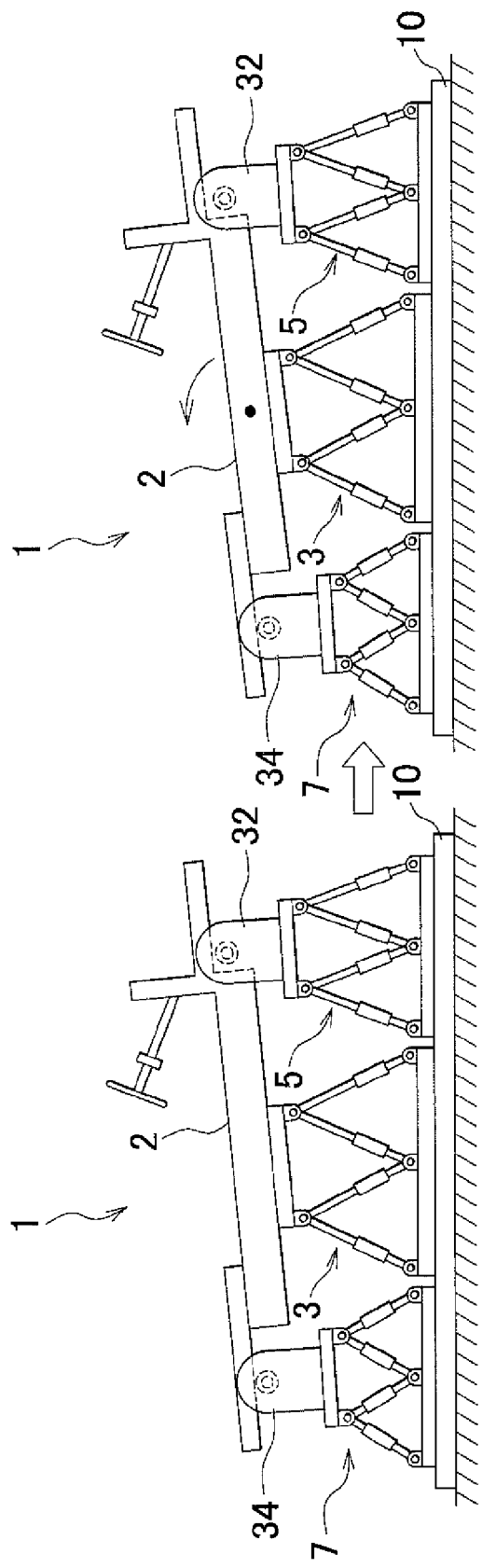

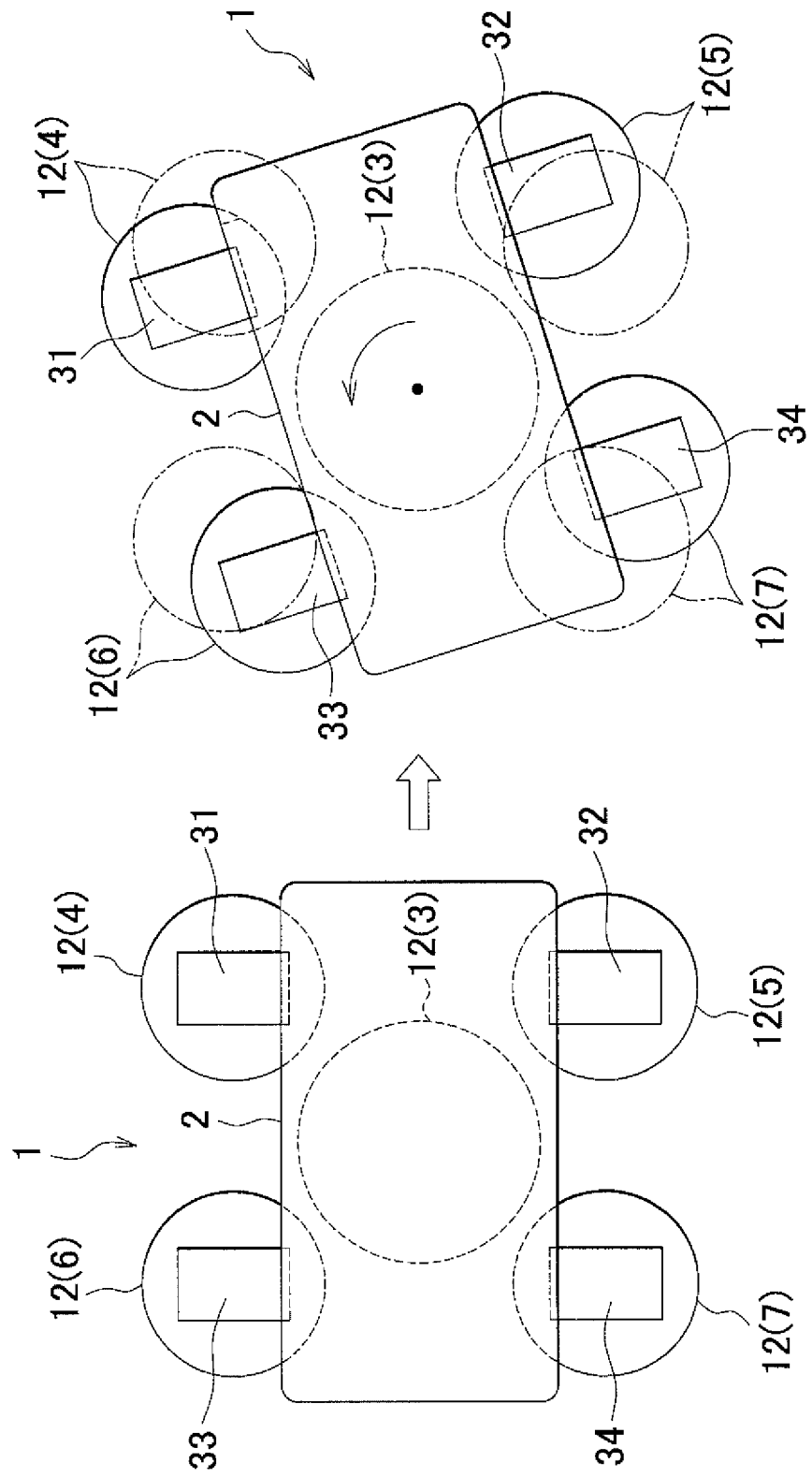

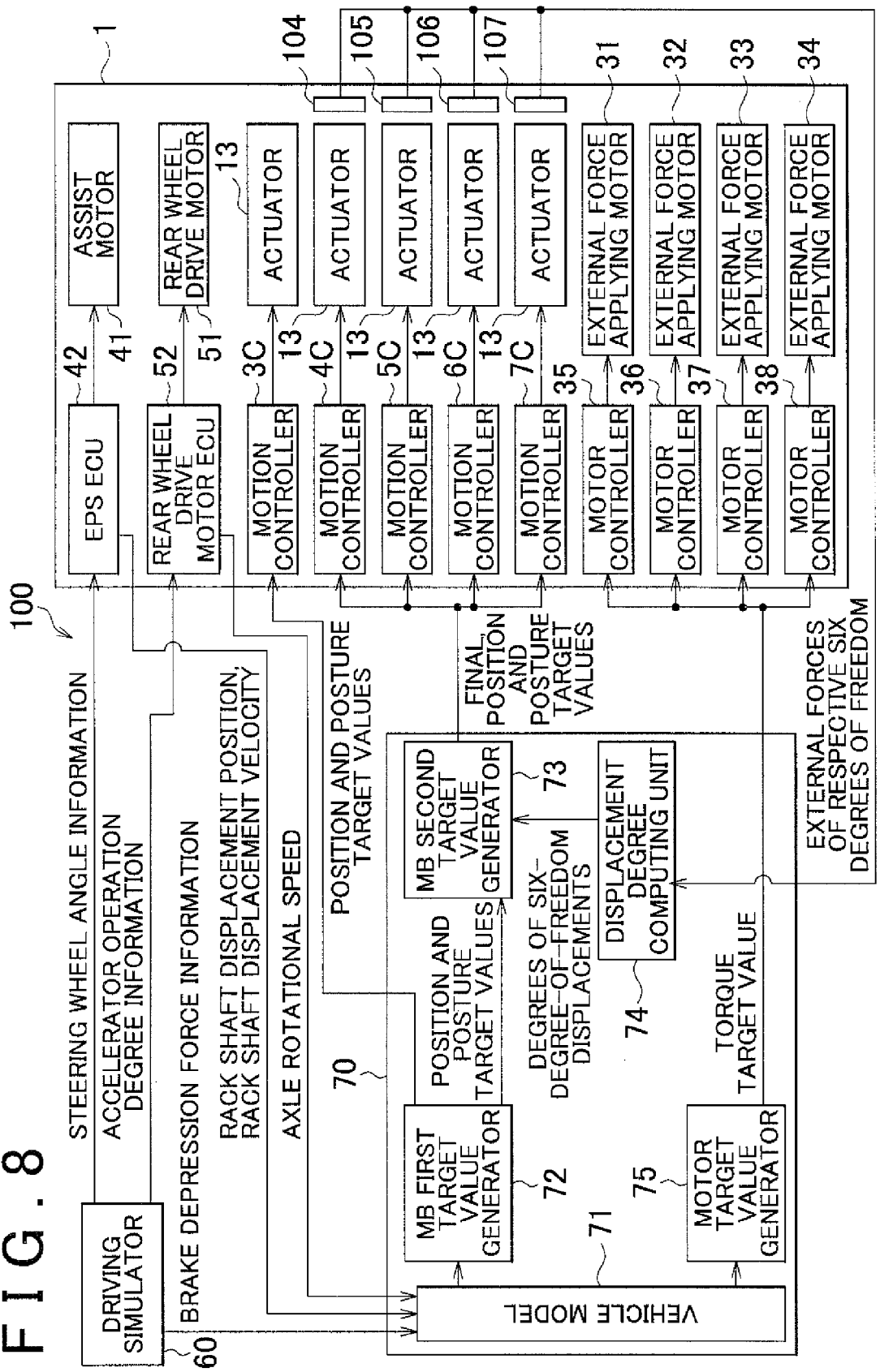

VEHICLE TEST SYSTEM

INCORPORATION BY REFERENCE

The disclosure of Japanese Patent Application No. 2013-094083 filed on Apr. 26, 2013 including the specification, drawings and abstract, is incorporated herein by reference in its entirety.

BACKGROUND OF THE INVENTION

1. Field of the Invention

The invention relates to a vehicle test system that conducts performance tests on automotive parts or vehicles.

2. Description of Related Art

Japanese Patent Application Publication No. 2008-175778 describes a vehicle test apparatus including: a pair of front and rear transversely movable bases that are movable in the transverse direction; four groups of hydraulic cylinders that make motions of six degrees of freedom, the four groups of hydraulic cylinders consisting of two pairs of right and left groups of hydraulic cylinders disposed on the top face of the front transversely movable base and two pairs of right and left groups of hydraulic cylinders disposed on the top face of the rear transversely movable base; four swivel lift bases that are respectively connected to upper ends of the four groups of hydraulic cylinders; and four turning belts that are respectively provided on the four swivel lift bases and on which four wheels of a vehicle are disposed. Refer also to Japanese Patent Application Publication No. 2006-138827, Japanese Patent Application Publication No. 2009-536736, and Published Japanese Translation of PCT application No. 2000-512610.

While an actual vehicle is, for example, accelerating, decelerating or turning, an inertial force acts on a vehicle body of the vehicle. In the above-described conventional test apparatus, in order to apply such an inertial force to a vehicle body, it is necessary to cause the vehicle body to move relative to turning belts that support wheels by turning the turning belts.

SUMMARY OF THE INVENTION

One object of the invention is to provide a vehicle test system that is able to apply forces similar to inertial forces that are applied to a vehicle body of an actual vehicle while the actual vehicle is, for example, accelerating, decelerating or turning, to a vehicle body of a test article without causing the vehicle body of the test article to move relative to members that support axles.

A vehicle test system according to an aspect of the invention includes: a test article installation vehicle body to which four axles corresponding to four wheels that are a left front wheel, a right front wheel, a left rear wheel and a right rear wheel are attached, and on which a test article is installed; a first motion base that supports the test article installation vehicle body, and that allows the test article installation vehicle body to make motions of six degrees of freedom; four electric motors that are connected to outer end portions of the respective axles to apply torques to the respective axles; four second motion bases that support the respective axles via the corresponding electric motors, and that allow the respective axles to make motions of six degrees of freedom; four external force detectors that individually detect external forces applied to the respective second motion bases from the test article installation vehicle body via the respective axles; a first target value generator that generates target values of a position and a posture to be taken by each of the motion bases, for each of the motion bases; a displacement degree computing unit that computes a degree of displacement of each of the second motion bases, which corresponds to an external force detected by a corresponding one of the external force detectors, on an assumption that each of the second motion bases has a virtual mechanical impedance for producing flexibility against the external force; a second target value generator that generates final position and posture target values for each of the second motion bases based on the position and posture target values for each of the second motion bases generated by the first target value generator and the degree of displacement of each of the second motion bases computed by the displacement degree computing unit; and a controller that controls the first motion base using the position and posture target values for the first motion base generated by the first target value generator, and controls the second motion bases using the final position and posture target values for the second motion bases generated by the second target value generator.

In the vehicle test system according to the above aspect, forces can be directly applied to the test article installation vehicle body by the first motion base in the state where the axles are supported by the second motion bases. Thus, forces similar to the inertial forces that are applied to the vehicle body of the actual vehicle during, for example, acceleration, deceleration, or turning of the actual vehicle, can be applied to the test article installation vehicle body without causing the test article installation vehicle body to move relative to the members that support the axles.

With the vehicle test system according to the above aspect, torques, which are similar to the torques externally applied to axles of an actual vehicle from the outside, for example, from a road surface, while the actual vehicle is travelling, can be applied to the axles of the test article installation vehicle body. In the vehicle test system according to the above aspect, it is possible to reproduce various vehicle travelling conditions by supporting and moving the test article installation vehicle body and the axles by one first motion base and four second motion bases. Thus, when various vehicle travelling conditions are reproduced, all the motion bases need to move in association with each other while maintaining the relative positional relationship among the secured points at which the motion bases are secured to the vehicle (the test article installation vehicle body and the electric motors). However, there is a possibility that it will not be possible to accurately move all the motion bases while maintaining the relative positional relationship among the secured points, due to the individual differences among mechanical elements and control performances.

In the vehicle test system according to the above aspect, the final position and posture target values for each of the second motion bases are generated based on the position and posture target values for each of the second motion bases generated by the first target value generator and the degree of displacement of each of the second motion bases computed by the displacement degree computing unit. Further, the position and posture of each of the second motion bases are controlled using the final position and posture target values. Thus, each second motion base is allowed to have flexibility against the external force applied to the second motion base. Therefore, even if an error occurs in the associated movement of all the motion bases, it is possible to absorb the error. Thus, it is possible to prevent forces that are not actually applied to the actual vehicle, from being applied to the test article installation vehicle body. Further, controllers for the motion bases are not required to have high control performances.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 5A and FIG. 5B are schematic views for describing an example of the control of motion bases when a vehicle travelling condition during acceleration on a flat road is simulated, FIG. 5A illustrating a condition in which a vehicle is at a standstill on a flat road, and FIG. 5B illustrating a condition in which the vehicle is accelerating on a flat road;

FIG. 6A and FIG. 6B are schematic views for describing an example of the control of the motion bases when a vehicle travelling condition during acceleration on a slope is simulated, FIG. 6A illustrating a condition in which the vehicle is at a standstill on a slope, and FIG. 6B illustrating a condition in which the vehicle is accelerating on a slope;

FIG. 7A and FIG. 7B are schematic views for describing an example of the control of the motion bases when a vehicle travelling condition during turning is simulated, FIG. 7A illustrating a condition in which the vehicle is travelling straight ahead, and FIG. 7B illustrating a condition in which the vehicle is turning;

FIG. 8 is a block diagram schematically illustrating the electrical configuration of a vehicle test system.

DETAILED DESCRIPTION OF EMBODIMENTS

Figure 1:
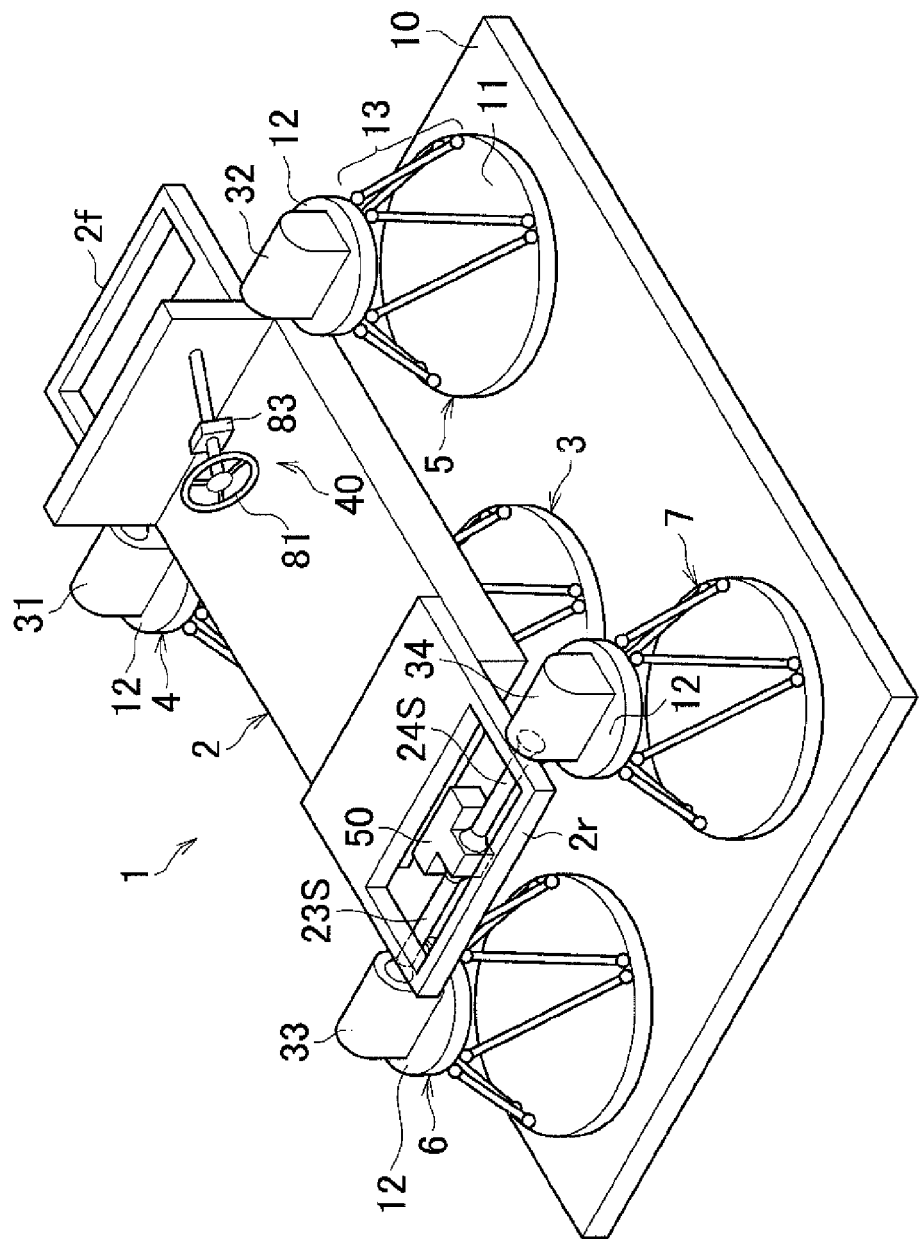
FIG. 1 is a perspective view schematically illustrating the appearance of a vehicle test apparatus included in a vehicle test system according to an embodiment of the invention.
Figure 2:
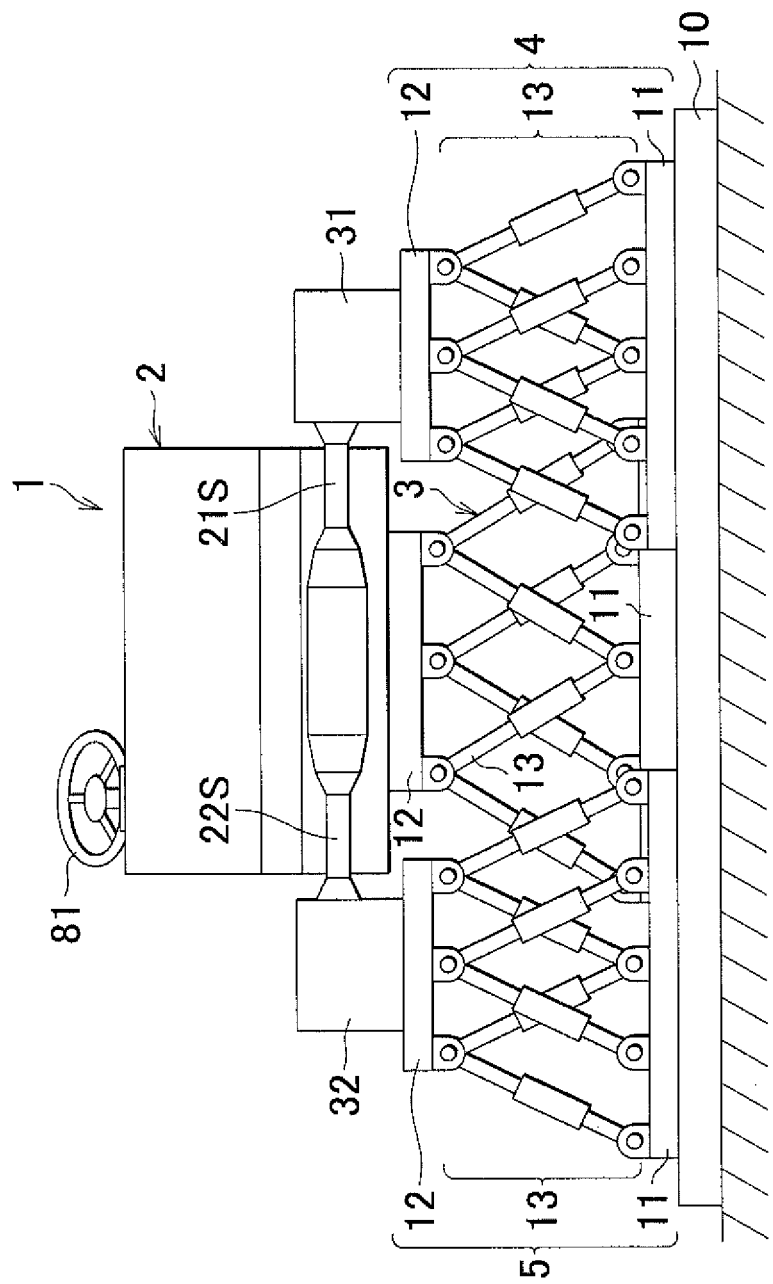
FIG. 2 is a front view illustrating the vehicle test apparatus in FIG. 1.
Figure 3:
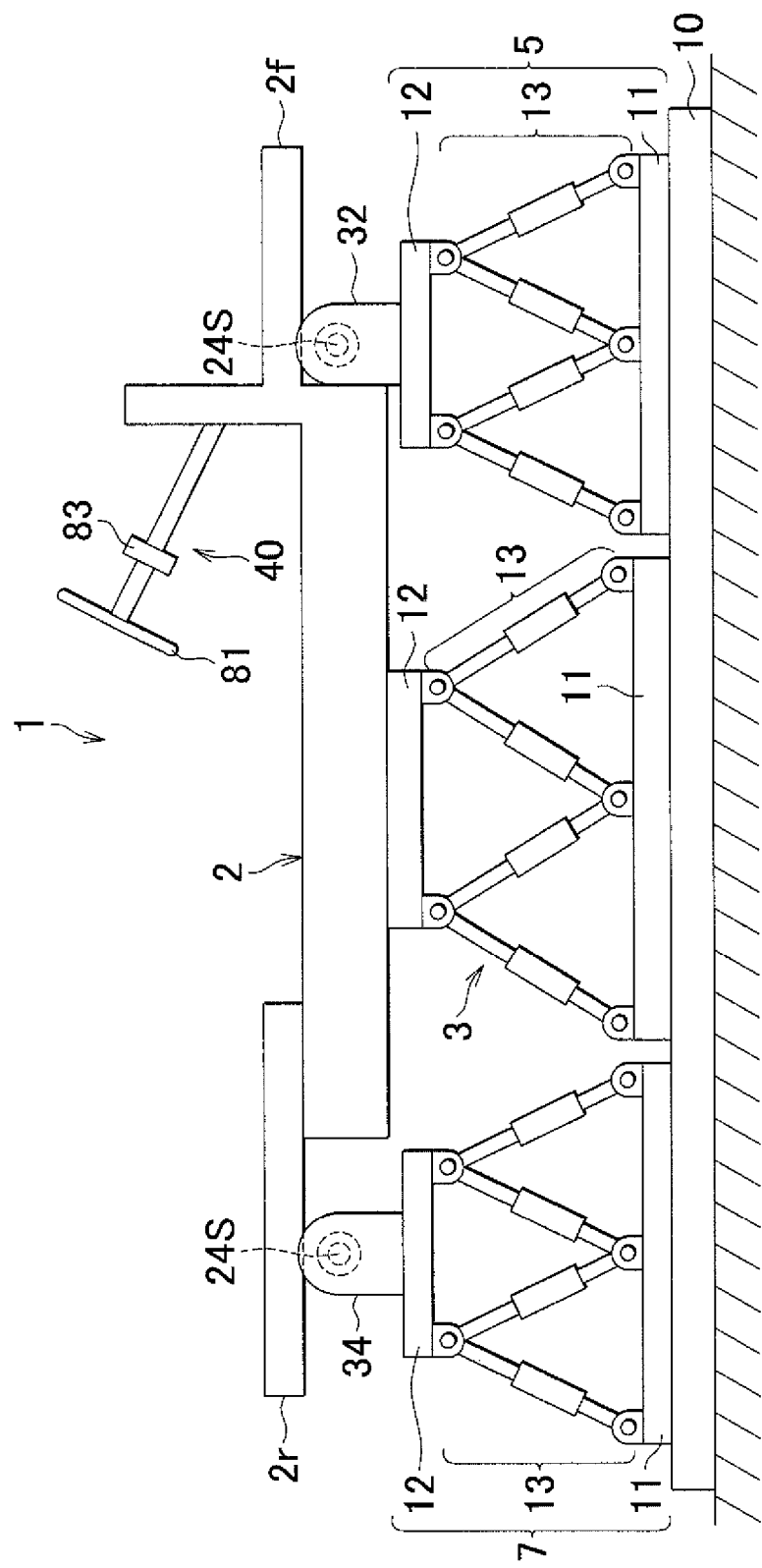
FIG. 3 is a side view illustrating the vehicle test apparatus in FIG. 1.
Figure 4:
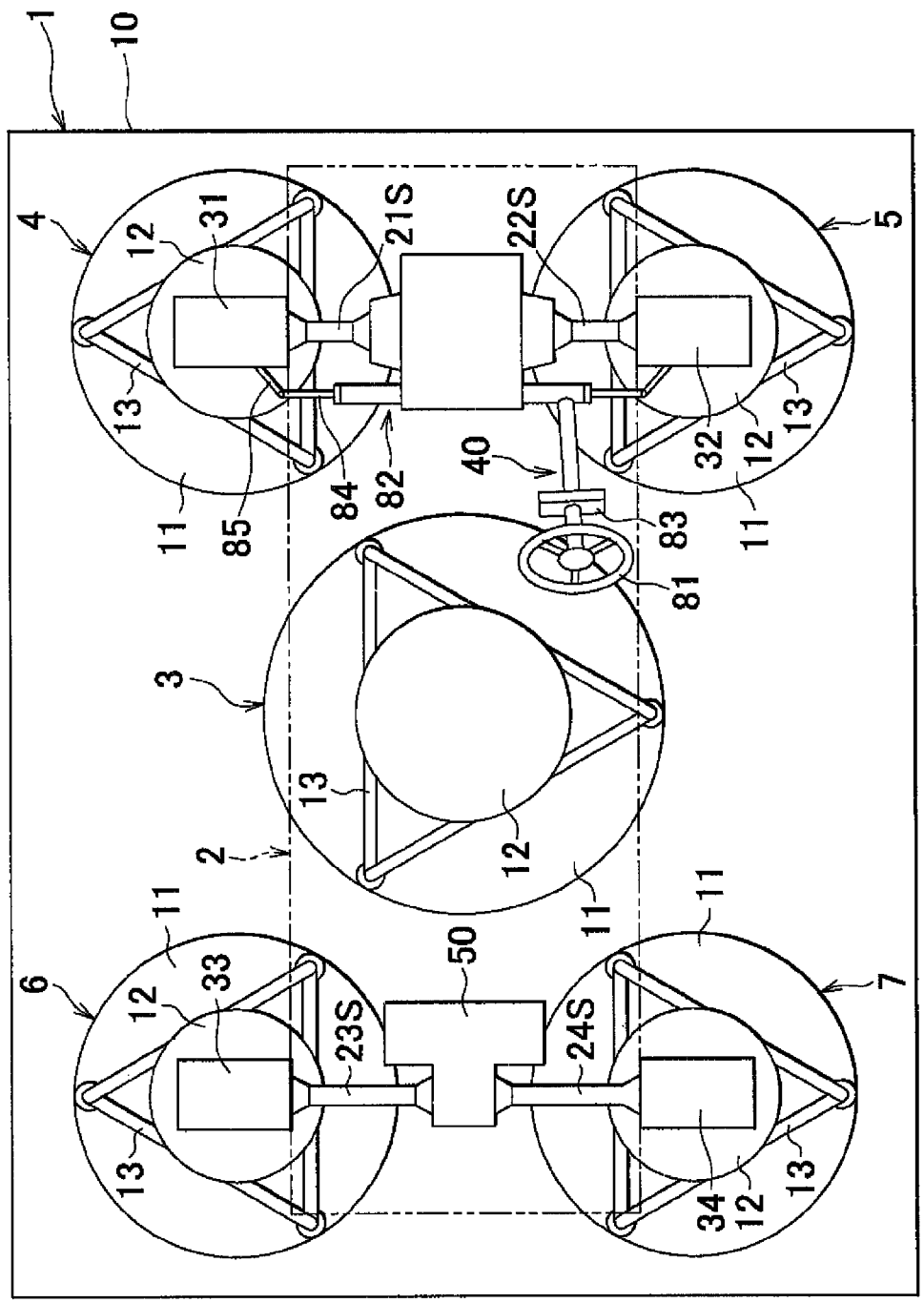
FIG. 4 is a plan view illustrating the vehicle test apparatus in FIG. 1.

Hereinafter, example embodiments of the invention will be described with reference to the accompanying drawings. FIG. 1 is a perspective view schematically illustrating the appearance of a vehicle test apparatus included in a vehicle test system according to an embodiment of the invention. FIG. 2 is a front view illustrating the vehicle test apparatus in FIG. 1. FIG. 3 is a side view illustrating the vehicle test apparatus in FIG. 1. FIG. 4 is a plan view illustrating the vehicle test apparatus in FIG. 1. In FIG. 4, a test article installation vehicle body is not illustrated.

A vehicle test apparatus 1 includes: a test article installation vehicle body 2 to which four axles 21S, 22S, 23S, 24S respectively corresponding to a left front wheel, a right front wheel, a left rear wheel and a right rear wheel are attached, and on which a test article is installed; a first motion base 3 that supports the test article installation vehicle body 2, and that causes the test article installation vehicle body 2 to make motions of six degrees of freedom; and four second motion bases 4, 5, 6, 7 that respectively support the axles 21S, 22S, 23S, 24S, and that respectively cause the axles 21S, 22S, 23S, 24S to make motions of six degrees of freedom.

In FIG. 1 to FIG. 4, a front end of the test article installation vehicle body 2 is denoted by a reference symbol 2f, and a rear end thereof is denoted by a reference symbol 2r. No vehicle wheels are fitted to the four axles 21S, 22S, 23S, 24S of the test article installation vehicle body 2. Output shafts of four electric motors (hereinafter, referred to as "external force applying motors") 31, 32, 33, 34 that apply torques to the four axles 21S, 22S, 23S, 24S of the test article installation vehicle body 2 are connected to outer end portions of the four axles 21S, 22S, 23S, 24S of the test article installation vehicle body 2. The external force applying motors 31, 32, 33, 34 apply torques, which are similar to the torques externally applied to respective axles of an actual vehicle when the actual vehicle is travelling, individually to the corresponding axles 21S, 22S, 23S, 24S. The torques externally applied to the respective axles include, for example, rotational loads that are applied to the axles of the actual vehicle due to road surface frictions or the like when the actual vehicle is travelling, and torques that are applied to the axles via a road surface when the actual vehicle is travelling on a downhill slope.

Test articles of automotive components of various kinds are installed on the test article installation vehicle body 2. In the present embodiment, an electric power steering system (EPS) 40, and a rear wheel drive module 50 that drives the axle 23S for the left rear wheel and the axle 24S for the right rear wheel with the use of the electric motors are installed, as the test articles, on the test article installation vehicle body 2. In the present embodiment, the EPS 40 is a column assist-type EPS. As is well known, the EPS 40 includes a steering wheel 81, a steering mechanism 82 that steers the front wheels in response to turning of the steering wheel 81, and a steering assist mechanism 83 that assists a driver in performing a steering operation. Note that, in the present embodiment, the steering mechanism 82 is not connected to the front wheels because no front wheels are provided. The steering wheel 81 and the steering mechanism 82 are mechanically linked to each other via a steering shaft.

The steering mechanism 82 includes a rack-and-pinion mechanism including a pinion provided at a lower end of the steering shaft, and a rack shaft having a rack that is meshed with the pinion. The steering assist mechanism 83 includes an electric motor 41 (refer to FIG. 8, hereinafter referred to as "assist motor 41") that generates a steering assist force, and a speed reduction mechanism (not illustrated) that transmits a torque output from the assist motor 41 to the steering shaft.

The EPS 40 includes an ECU 42 (refer to FIG. 8, hereinafter referred to as "EPS ECU 42") that controls the assist motor 41, and a linear displacement sensor (not illustrated) that detects an axial displacement position of the rack shaft. The rear wheel drive module 50 includes an electric motor 51 (refer to FIG. 8, hereinafter referred to as "rear wheel drive motor 51") that rotates the axles 23S, 24S for the rear wheels, a transmission mechanism (not illustrated) that transmits a torque from the rear wheel drive motor 51 to the axles 23S, 24S for the rear wheels, an ECU 52 (refer to FIG. 8, hereinafter referred to as "rear wheel drive motor ECU 52") that controls the rear wheel drive motor 51, and a rotation angle sensor (not illustrated) that detects a rotation angle of at least one of the axles 23S, 24S for the rear wheels. The transmission mechanism includes a clutch and a speed reduction mechanism. However, the transmission mechanism may include only one of the clutch and the speed reduction mechanism.

The motion bases 3, 4, 5, 6, 7 are secured to a base plate 10 disposed on a floor. As is well known, each of the motion bases 3, 4, 5, 6, 7 includes a stationary base 11 secured to the base plate 10, a movable base (moving base) 12 disposed above the stationary base 11, an actuator 13 that is disposed between and connected to the stationary base 11 and the movable base 12 and that causes the movable base 12 to make motions of six degrees of freedom (longitudinal, transverse, vertical, rolling, pitching and yawing motions), and a motion controller (not illustrated) that executes drive control of the actuator 13. The actuator 13 is composed of six electric cylinders.

The test article installation vehicle body 2 is secured to the movable base 12 of the first motion base 3, with a center portion of the test article installation vehicle body 2 disposed on the movable base 12 of the first motion base 3. That is, the center portion of the bottom face of the test article installation vehicle body 2 is attached to the top face of the movable base 12 of the motion base 3. The external force applying motor 31 is mounted on the movable base 12 of the second motion base 4 on the left front side. The external force applying motor 32 is mounted on the movable base 12 of the second motion base 5 on the right front side. The external force applying motor 33 is mounted on the movable base 12 of the second motion base 6 on the left rear side. The external force applying motor 34 is mounted on the movable base 12 of the second motion base 7 on the right rear side.

In the vehicle test apparatus 1, the test article installation vehicle body 2 is supported by the first motion base 3. The external force applying motors 31, 32, 33, 34 are supported respectively by the second motion bases 4, 5, 6, 7. In other words, the outer end portions of the axles 21S, 22S, 23S, 24S are supported by the second motion bases 4, 5, 6, 7 via the external force applying motors 31, 32, 33, 34, respectively.

Thus, in the vehicle test apparatus 1, various vehicle body postures can be created by executing drive control of the actuator 13 of the first motion base 3. Various road surface conditions can be created by respectively executing drive control of the actuators 13 of the second motion bases 4, 5, 6, 7. Thus, by individually controlling the actuators 13 of the motion bases 3, 4, 5, 6, 7, it is possible to simulate various vehicle travelling conditions.

In the vehicle test apparatus 1, torques similar to the torques (external forces) externally applied to axles of an actual vehicle when the actual vehicle is travelling can be applied individually to the corresponding axles 21S, 22S, 23S, 24S. Thus, drive loads and suspension behaviors in accordance with an actual operating state can be reproduced. In the vehicle test apparatus 1, forces can be directly applied to the test article installation vehicle body 2 by the first motion base 3 in the state where the axles 21S, 22S, 23S, 24S are supported by the second motion bases 4, 5, 6, 7, respectively. Thus, forces similar to the inertial forces that are applied to the vehicle body of the actual vehicle during, for example, acceleration, deceleration, or turning of the actual vehicle, can be applied to the test article installation vehicle body 2 without causing the test article installation vehicle body 2 to move relative to the members that support the axles 21S, 22S, 23S, 24S.

In the vehicle test apparatus 1, the test article installation vehicle body 2 is allowed to make a yawing motion by the first motion base 3. Thus, it is possible to simulate a yawing motion. Hereinafter, more detailed description will be provided. In the following description, an X-axis denotes an axis that extends in the longitudinal direction of the vehicle body and passes through the center of gravity of the test article installation vehicle body 2, a Y-axis denotes an axis that extends in the lateral direction of the vehicle body and passes through the center of gravity of the test article installation vehicle body 2, and a Z-axis denotes an axis that extends in the up-down direction of the vehicle body and passes through the center of gravity of the test article installation vehicle body 2. That is, the X-axis, Y-axis and Z-axis belong to a coordinate system (hereinafter, referred to as "vehicle body coordinate system") fixed to the test article installation vehicle body 2.

FIG. 5A and FIG. 5B are schematic views for describing an example of the control of the motion bases 3, 4, 5, 6, 7 when a vehicle travelling condition during acceleration on a flat road is simulated. FIG. 5A illustrates a condition in which the vehicle is at a standstill on a flat road. In this case, the top faces of the movable bases 12 of the motion base 3, 4, 5, 6, 7 are parallel to the top face of the base plate 10. Further, the heights of the movable bases 12 of the motion base 3, 4, 5, 6, 7 are adjusted such that an XY plane that is defined by the X-axis and the Y-axis of the vehicle body coordinate system is parallel to the top face of the base plate 10.

The vehicle travelling condition during acceleration on a flat road can be created as follows. As illustrated in FIG. 5B, all the second motion bases 4, 5, 6, 7 are held in the standstill condition illustrated in FIG. 5A, and then the actuator 13 of the first motion base 3 is driven to rotate the movable base 12 of the first motion base 3 in a first direction (direction indicated by an arrow) around the Y-axis. The first direction around the Y-axis is such a direction that the front end of the test article installation vehicle body 2 is lifted up.

That is, in the condition in which the external force applying motors 31, 32, 33, 34 are supported by the corresponding second motion bases 4, 5, 6, 7, the movable base 12 of the first motion base 3 is rotated in the first direction around the Y-axis. Thus, a torque for rotating the test article installation vehicle body 2 in the first direction around the Y-axis is directly applied to the test article installation vehicle body 2. A force similar to an inertial force that is applied to the vehicle body of the actual vehicle during acceleration can be directly applied to the test article installation vehicle body 2. Thus, it is possible to simulate the vehicle travelling condition during acceleration on a flat road, without causing the test article installation vehicle body 2 to move relative to the members that support the axles 21S, 22S, 23S, 24S. In this case, it is possible to evaluate a pitching behavior, a suspension behavior, and the like.

In order to simulate a vehicle travelling condition during deceleration, the direction of a torque around the Y-axis, which is applied to the movable base 12 of the first motion base 3, is set to the direction opposite to the first direction that is adopted when the vehicle travelling condition during acceleration is simulated (set to such a direction that the rear end of the test article installation vehicle body 2 is lifted up).

FIG. 6A and FIG. 6B are schematic views for describing an example of the control of the motion bases 3, 4, 5, 6, 7 when a vehicle travelling condition during acceleration on a slope is simulated. The case where the slope on which the vehicle is travelling is an uphill slope will be described.

FIG. 6A illustrates a condition in which the vehicle is at a standstill on a slope. In this case, the top faces of the movable bases 12 of the motion bases 3, 4, 5, 6, 7 are parallel to the surface of the assumed slope. In addition, the heights of the movable bases 12 of the motion bases 3, 4, 5, 6, 7 are adjusted such that the XY plane defined by the X-axis and the Y-axis of the vehicle body coordinate system is parallel to the surface of the assumed slope.

This standstill condition can be created from the standstill condition on a flat road in the following manner. The movable base 12 of the first motion base 3 is rotated by a prescribed degree in the first direction around the Y-axis in accordance with a slope angle of the slope. At the same time, the movable bases 12 of the second motion bases 4, 5, 6, 7 are rotated by a prescribed degree in the first direction around the Y-axis in accordance with the slope angle of the slope, and are moved in the Z-axis direction (up-down direction). The first direction around the Y-axis is such a direction that the front end of the test article installation vehicle body 2 is lifted up. In this case, the movable bases 12 of the two second motion bases 4, 5 on the front side are moved upward, while the movable bases 12 of the two second motion bases 6, 7 on the rear side are moved downward.

The vehicle travelling condition during acceleration on a slope can be created from the standstill condition illustrated in FIG. 6A in the following manner. As illustrated in FIG. 6B, the movable bases 12 of all the second motion bases 4, 5, 6, 7 are held in the standstill condition on the slope as illustrated in FIG. 6A, and the actuator 13 of the first motion base 3 is driven to rotate the movable base 12 of the first motion base 3 in the first direction (indicated by an arrow) around the Y-axis.

In the condition in which the external force applying motors 31, 32, 33, 34 are respectively supported by the second motion bases, 4, 5, 6, 7, the movable base 12 of the first motion base 3 is rotated in the first direction around the Y-axis. Thus, a torque for rotating the test article installation vehicle body 2 in the first direction around the Y-axis is directly applied to the test article installation vehicle body 2. That is, a force similar to an inertial force that is applied to the vehicle body of the actual vehicle during acceleration on a slope (uphill slope in this case), can be directly applied to the test article installation vehicle body 2. Thus, it is possible to simulate the vehicle travelling condition during acceleration on a slope without causing the test article installation vehicle body 2 to move relative to the members that support the axles 21S, 22S, 23S, 24S. In this case, it is possible to evaluate a pitching behavior, suspension and drive shaft behaviors, hub bearings and the like.

Note that, in order to simulate a vehicle travelling condition during deceleration on a slope, the direction of a torque around the Y-axis, which is applied to the movable base 12 of the first motion base 3, is set to the direction opposite to the first direction that is adopted when the vehicle travelling condition during acceleration on a slope is simulated (set to such a direction that the rear end of the test article installation vehicle body 2 is lifted up). FIG. 7A and FIG. 7B are schematic views for describing an example of the control of the motion bases 3, 4, 5, 6, 7 when a vehicle travelling condition during turning is simulated.

FIG. 7A illustrates a condition in which the vehicle is travelling straight ahead. The case where the vehicle turns to the left, as illustrated in FIG. 7B, from the condition in which the vehicle is travelling straight ahead, will be described. As illustrated in FIG. 7B, in order to turn the test article installation vehicle body 2 to the left, the movable base 12 of the first motion base 3 is rotated counterclockwise around the Z-axis as viewed in a planar view. The movable bases 12 of all the second motion bases, 4, 5, 6, 7 are rotated counterclockwise around the Z-axis as viewed in a plan view, and are moved in the XY plane defined by the X-axis and Y-axis of the vehicle body coordinate system in order to move the external force applying motors 31, 32, 33, 34 in accordance with the rotation of the test article installation vehicle body 2. Thus, the movable bases 12 of the second motion bases, 4, 5, 6, 7 are moved from positions indicated by two-dot chain lines to positions indicated by solid lines in FIG. 7B. Thus, the travelling condition during turning can be simulated. In this case, it is possible to evaluate axial loads applied to the axles 21S, 22S, 23S, 24S, a steering torque, a rack axis force, a hub bearings and the like.

Hereinafter, a vehicle test system 100 including the vehicle test apparatus 1 will be described. FIG. 8 is a block diagram schematically illustrating the electrical configuration of the vehicle test system 100. The vehicle test system 100 includes a driving simulator 60, the vehicle test apparatus 1 and an actuator controller 70. The driving simulator 60 virtually simulates a vehicle operation, and is manipulated by an operator. In the vehicle test apparatus 1, the EPS 40, the rear wheel drive module 50 and motor controllers 35, 36, 37, 38 that control the external force applying motors 31, 32, 33, 34 are mounted. The actuator controller 70 is a computer, and controls the motion bases 3, 4, 5, 6, 7 of the vehicle test apparatus 1 and the motor controllers 35, 36, 37, 38 mounted on the vehicle test apparatus 1.

As described above, the EPS 40 includes the assist motor 41, the EPS ECU 42 that controls the assist motor 41, and the linear displacement sensor (not illustrated) that detects an axial displacement position of the rack shaft. As described above, the rear wheel drive module 50 includes the rear wheel drive motor 51, the rear wheel drive motor ECU 52 that controls the rear wheel drive motor 51, and the rotation angle sensor (not illustrated) that detects a rotation angle of at least one of the rear wheel axles 23S, 24S.

The second motion bases 4, 5, 6, 7 are provided with six-axis force sensors 104, 105, 106, 107 that detect external forces of respective six degrees of freedom applied to the second motion bases 4, 5, 6, 7 from the test article installation vehicle body 2 via the axles 21S to 24S and the external force applying motors 31, 32, 33, 34. The external forces of respective six degrees of freedom include an external force in the x-direction, an external force in the y-direction, an external force in the z-direction, an external torque around the x-axis, an external torque around the y-axis, and an external torque around the z-axis in the xyz coordinate system fixed to each second motion base.

For example, steering angle information (steering wheel angle information), accelerator operation degree information, and brake depression force information according to an operation of the driving simulator 60 are output from the driving simulator 60. The steering angle information output from the driving simulator 60 is transmitted to the EPS ECU 42 mounted on the vehicle test apparatus 1. The accelerator operation degree information output from the driving simulator 60 is transmitted to the rear wheel drive motor ECU 52 mounted on the vehicle test apparatus 1. The brake depression force information output from the driving simulator 60 is transmitted to the actuator controller 70. Instead of the brake depression force information, brake depression degree information may be used.

The EPS ECU 42 determines a steering torque on the basis of the steering angle information transmitted from the driving simulator 60, and executes drive control of the assist motor 41 on the basis of the thus determined steering torque. The EPS ECU 42 measures an axial displacement amount of the rack shaft included in the EPS 40 (hereinafter, referred to as "rack shaft displacement amount"), and an axial displacement velocity of the rack shaft (hereinafter, referred to as "rack shaft displacement velocity"), on the basis of an output signal from the linear displacement sensor, and transmits the thus measured values to the actuator controller 70.

The rear wheel drive motor ECU 52 determines a torque command value for the rear wheel drive motor 51 on the basis of the accelerator operation degree information transmitted from the driving simulator 60, and executes drive control of the rear wheel drive motor 51 on the basis of the thus determined torque command value. Further, the rear wheel drive motor ECU 52 measures rotational speeds of the rear wheel axles 23S, 24S (hereinafter, referred to as "axle rotational speeds") on the basis of an output signal from the rotation angle sensor, and transmits the thus measured values to the actuator controller 70.

The actuator controller 70 includes a vehicle model 71, a motion base first target value generator 72 (hereinafter, referred to as "MB first target value generator 72"), a motion base second target value generator 73 (hereinafter, referred to as "MB second target value generator 73"), a displacement degree computing unit 74, and a motor target value generator 75. The vehicle model 71 receives the brake depression force information output from the driving simulator 60, the rack shaft displacement amount and the rack shaft displacement velocity that are transmitted from the BPS ECU 42, and the axle rotational speed transmitted from the rear wheel drive motor ECU 52. The vehicle model 71 creates a position and a posture of the vehicle body, positions and postures of the wheels, and external forces applied to the axles in accordance with the operating condition simulated by the driving simulator 60.

The motor target value generator 75 generates target values (torque target values) of motor torques that should be generated by the external force applying motors 31, 32, 33, 34 on the basis of the external forces that are generated by the vehicle model 71 and applied to the axles 21S, 22S, 23S, 24S. The torque target values for the respective external force applying motors 31, 32, 33, 34, which are generated by the motor target value generator 75, are provided to the corresponding motor controllers 35, 36, 37, 38. The motor controllers 35, 36, 37, 38 control the corresponding external force applying motors 31, 32, 33, 34 on the basis of the torque target values provided by the motor target value generator 75. Thus, the external force applying motors 31, 32, 33, 34 generate motor torques corresponding to the torque target values.

The MB first target value generator 72 generates target values (position and posture target values) of positions and postures that are to be taken by the motion bases 3, 4, 5, 6, 7 on the basis of the position and the posture of the vehicle body and the positions and the postures of the wheels that are created by the vehicle model 71. The position and posture target values for the first motion base 3, which are generated by the MB first target value generator 72, are provided to a motion controller 3C for the first motion base 3. The motion controller 3C for the first motion base 3 controls the corresponding actuator 13 on the basis of the position and posture target values provided by the MB first target value generator 72. Thus, the position and posture of the movable base 12 of the first motion base 3 are controlled so as to coincide with the position and posture corresponding to the position and posture target values.

On the assumption that each of the second motion bases 4, 5, 6, 7 has a virtual mechanical impedance for producing flexibility against an external force, the displacement degree computing unit 74 computes the degrees of six-degree-of-freedom displacements of the second motion bases 4, 5, 6, 7, which correspond to external forces of respective six degrees of freedom detected by the six-axis force sensors 104, 105, 106, 107. The degrees of six-degree-of-freedom displacements include a degree of displacement in the x-direction, a degree of displacement in the y-direction, and a degree of displacement in the z-direction in the xyz coordinate system fixed to each second motion base, a degree of displacement in roll angle, a degree of displacement in pitch angle, and a degree of displacement in yaw angle. As described later, the virtual mechanical impedances include a virtual spring and a virtual damper. The operation of the displacement degree computing unit 74 will be described later in detail.

The position and posture target values for the second motion bases 4, 5, 6, 7 generated by the MB first target value generator 72 are provided to the MB second target value generator 73. The MB second target value generator 73 generates final position and posture target values for the second motion bases 4, 5, 6, 7 based on the position and posture target values for the second motion bases 4, 5, 6, 7 and the degrees of six-degree-of-freedom displacements of the second motion bases 4, 5, 6, 7 computed by the displacement degree computing unit 74. Specifically, the MB second target value generator 73 generates the final position and posture target values for the second motion bases 4, 5, 6, 7 by adding the degrees of six-degree-of-freedom displacements of the second motion bases 4, 5, 6, 7 to the position and posture target values for the corresponding second motion bases 4, 5, 6, 7.

The final position and posture target values for the second motion bases 4, 5, 6, 7 generated by the MB second target value generator 73 are provided to motion controllers 4C, 5C, 6C, 7C for the corresponding second motion bases 4, 5, 6, 7. The motion controllers 4C, 5C, 6C, 7C for the second motion bases 4, 5, 6, 7 control the corresponding actuators 13 based on the final position and posture target values provided by the MB second target value generator 73. Thus, the positions and postures of the movable bases 12 of the second motion bases 4, 5, 6, 7 are controlled so as to coincide with the positions and postures corresponding to the final position and posture target values.

Hereinafter, the operation of the displacement degree computing unit 74 will be described. The six-axis force sensors 104, 105, 106, 107, the displacement degree computing unit 74 and the MB second target value generator 73 constitute an impedance controller that executes impedance control. The impedance control is a control for causing a behavior of a target mass when an external force is applied to the target mass, to coincide with a behavior of a virtual mechanical impedance model including a virtual spring, a virtual mass and a virtual damper. Specifically, a force-torque sensor (six-axis force sensor) provided on the target mass detects external forces of respective six degrees of freedom (external forces and external torques), and inputs the detected values into the virtual mechanical impedance model. It is possible to obtain translational and rotational behaviors of the target mass from the virtual mechanical impedance model and the input values. If the translational and the rotational behaviors are provided as position and posture target values for the actuators, it is possible to realize the above-described control.

Figure 9A:
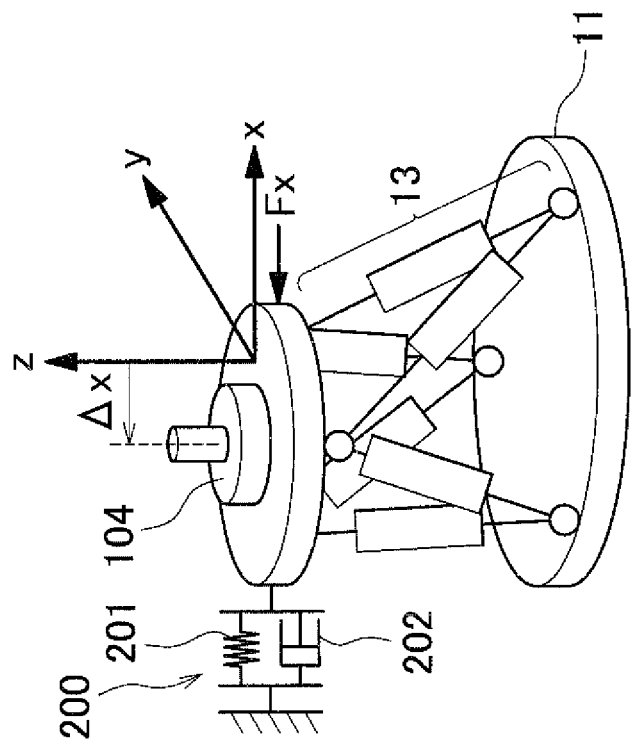
FIG. 9A and FIG. 9B are views for describing the concept of impedance control when an external force in the x-direction is applied to a second motion base on the left front side.
Figure 9B:
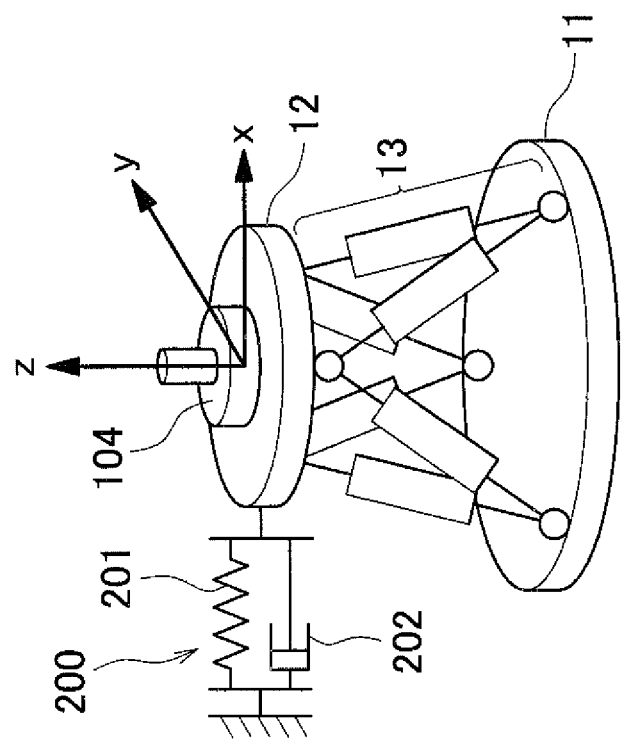

FIG. 9A and FIG. 9B are views for describing the concept of impedance control when an external force in the x-direction is applied to the second motion base on the left front side. The x-axis, y-axis and z-axis in FIG. 9A and FIG. 9B belong to an xyz coordinate system fixed to the second motion base on the left front side. As illustrated in FIG. 9A, a virtual mechanical impedance 200 is disposed between the movable base 12 of the second motion base 4 on the front left side and a virtual vertical wall. The virtual mechanical impedance 200 is formed of a virtual spring 201 and a virtual damper 202. When an external force in the x-direction is applied to the movable base 12, the virtual spring 201 is deformed in the x-direction based on the external force, and the virtual damper 202 attenuates the external force. The movable base 12 of the second motion base 4 is provided with the six-axis force sensor 104 that detects external forces (external forces and external torques) of respective six degrees of freedom applied from the test article installation vehicle body 2 via the axles 21S. Note that, actually, the six-axis force sensor 104 is disposed at such a position that attachment of the external force applying motor 31 is not hindered.

As illustrated in FIG. 9B, when an external force Fx in the x-axis direction is applied to the movable base 12 of the second motion base 4, the external force Fx is attenuated by the virtual damper 202 and the virtual spring 201 is deformed. As a result, the movable base 12 is displaced in the x-direction by a displacement degree Δx. The displacement degree Δx is computed by the displacement degree computing unit 74, and is reflected in the position and posture target values for the second motion base 4.

The displacement degree computing unit 74 computes the six-degree-of-freedom displacements corresponding to the external forces of respective six degrees of freedom with the use of the virtual mechanical impedance model. The virtual mechanical impedance model is defined Equations (1) to (4) indicated below. In Equations (1) to (4), a dash on the upper right side of a symbol denotes expression in a coordinate system fixed to a target mass, which is called as a body coordinate system, and a tilde denotes a skew-symmetric matrix.

$$M_D \dot{V}_D = F_S + F_{VS} + F_{VD} \quad \text{Equation (1)}$$

$$\dot{X}_D = V_D \quad \text{Equation (2)}$$

$$J'_D \dot{Q}'_D + \tilde{Q}'_D J'_D Q'_D = T'_S + T'_{VS} + T'_{VD} \quad \text{Equation (3)}$$
$$Q'_D = S\Theta$$

$$S = \begin{bmatrix} 1 & 0 & -\sin\beta \\ 0 & \cos\alpha & -\cos\alpha\sin\beta \\ 0 & -\sin\alpha & \cos\alpha\cos\beta \end{bmatrix} \quad \text{Equation (4)}$$

$$\Theta = [\alpha \ \beta \ \gamma]^T$$

$M_D$: virtual mass of virtual mechanical impedance model
$V_D$: translational velocity of target mass
$F_S$: external force detected by six-axis force sensor
$F_{VS}$: force produced by virtual spring
$F_{VD}$: force produced by virtual damper
$X_D$: displacement of target mass
$J_D$: virtual inertia moment (inertia tensor) of virtual mechanical impedance model
$Q_D$: angular velocity of target mass
$T_S$: external torque detected by six-axis force sensor
$T_{VS}$: torque produced by virtual spring
$T_{VD}$: torque produced by virtual damper
$\Theta$: Eulerian angle of target mass Equation (1) is a dynamic equation (a kinetic equation) of translational motions (translational motions in the x-direction, y-direction and z-direction). Equation (2) is a kinetic equation that defines a relationship between a translational velocity and a displacement. Equation (3) is a dynamic equation (a kinetic equation) of a rotational motion. Equation (4) is a kinetic equation that defines a relationship between an angular velocity and a posture. A posture is expressed by Eulerian angles (a roll angle α, a pitch angle β and a yaw angle γ).

$F_{VS}$, $F_{VD}$, $T_{VS}$, $T_{VD}$ are defined by Equations (5), (6), (7), (8), respectively.

$$F_{VS} = -K_{TVS} X_D \quad \text{Equation (5)}$$

$$F_{VD} = -C_{TVD} V_D \quad \text{Equation (6)}$$

$$T'_{VS} = -K'_{RVS} \Theta \quad \text{Equation (7)}$$

$$T'_{VD} = -C'_{RVD} \Omega'_D \quad \text{Equation (8)}$$

$K_{TVS}$: virtual translational stiffness of virtual mechanical impedance model (expressed in the body coordinate system)
$C_{TVD}$: virtual translational viscosity of virtual mechanical impedance model (expressed in the body coordinate system)
$K_{RVS}$: torsional stiffness of virtual mechanical impedance model (expressed in the body coordinate system)
$C_{RVD}$: torsional viscosity of virtual mechanical impedance model (expressed in the body coordinate system)

MD, JD, $K_{TVS}$, $K_{TVD}$, $K_{RVS}$, $K_{RVD}$ are parameters of the virtual mechanical impedance model, and a user can set any values as the parameters. As the stiffness and viscosity, values used in place of the spring and the damper should be selected. As the mass, a value obtained by adding a load mass of a test target to a mass of the movable base portion should be selected. The displacement degree computing unit 74 computes six-degree-of-freedom displacements of the second motion bases 4, 5, 6, 7 with the use of the MD, JD, $K_{TVS}$, $K_{TVD}$, $K_{RVS}$, $K_{RVD}$ set in advance, the external forces of respective six degrees of freedom (external forces and an external torques) detected by the six-axis force sensors 104 to 107, and Equations (1) to (8).

In the vehicle test apparatus 1, various vehicle travelling conditions (vehicle behaviors) are reproduced by moving the test article installation vehicle body 2 and the axles 21S, 22S, 23S, 24S that are supported by the five motion bases 3, 4, 5, 6, 7. Therefore, in order to reproduce the various vehicle travelling conditions, it is necessary to move all the motion bases 3, 4, 5, 6, 7 in association with each other while relative positional relationships among secured points at which the motion bases 3, 4, 5, 6, 7 are secured to the vehicle (the test article installation vehicle body 2 and the external force applying motors 31, 32, 33, 34) are maintained. However, due to individual differences of machine elements, control performance or the like, there is a possibility that it will not be possible to accurately move all the motion bases 3, 4, 5, 6, 7 in association with each other such that the relative positional relationships, among the secured points are maintained.

In the present embodiment, the final position and posture target values for the second motion bases 4, 5, 6, 7 are generated based on the position and posture target values for the second motion bases 4, 5, 6, 7 generated by the MB first target value generator 72 and the six-degree-of-freedom displacements of the second motion bases 4, 5, 6, 7 computed by the displacement degree computing unit 74. The positions and postures of the second motion bases 4, 5, 6, 7 are controlled based on the final position and posture target values. That is, the impedance control is adopted as the position and posture control for the second motion bases 4, 5, 6, 7.

Thus, each of the second motion bases 4, 5, 6, 7 is allowed to have flexibility against an external force applied thereto. Thus, even if errors are caused in the associating operation among all the motion bases 3, 4, 5, 6, 7, the errors can be absorbed through impedance control of the second motion bases 4, 5, 6, 7. Thus, it is possible to prevent forces that are not actually applied to the actual vehicle, from being applied to the test article installation vehicle body 2. Further, controllers (for example, the actuator controller 70, and the motion controllers 3C, 4C, 5C, 6C, 7C) for the motion bases 3, 4, 5, 6, 7 are not required to have high control performances.

While one example embodiment of the invention has been described above, the invention may be implemented in various other embodiments. For example, in the aforementioned embodiment, the impedance control is adopted only for the position and posture control of the second motion bases 4, 5, 6, 7. However, the impedance control may be adopted also for the position and posture control of the first motion base 3.

What is claimed is:

1. A vehicle test system comprising:
   a test article installation vehicle body to which four axles corresponding to four wheels that are a left front wheel, a right front wheel, a left rear wheel and a right rear wheel are attached, and on which a test article is installed;
   a first motion base that supports the test article installation vehicle body, and that allows the test article installation vehicle body to make motions of six degrees of freedom;
      four electric motors that are connected to outer end portions of the respective axles to apply torques to the respective axles, the torques being external forces that are applied to the respective axles;
   four second motion bases that support the respective axles via the corresponding electric motors, and that allow the respective axles to make motions of six degrees of freedom, wherein
   each of the first motion base and the second motion bases includes a stationary base, a movable base disposed above the stationary base, and an actuator that is disposed between and connected to the stationary base and the movable base, and that allows the movable base to make motions of six degrees of freedom, and
   each of the electric motors is disposed between an outer end portion of an axle and a corresponding movable base of the second motion bases, the electric motor being directly connected to the outer end portion of the axle and the corresponding movable base of the second motion bases;
   four external force detectors that individually detect the external forces, which are applied to the respective second motion bases from the test article installation vehicle body via the external forces applied by the four electric motors to respective axles;
   a first target value generator that generates target values of a position and a posture to be taken by each of the first motion base and the second motion bases, for each of the first motion base and the second motion bases;
   a displacement degree computing unit that computes a degree of displacement of each of the second motion bases, which corresponds to the external force detected by a corresponding one of the external force detectors, wherein the external forces applied to the respective second motion bases from the test article installation vehicle body via the external forces applied by the four electric motors to respective axles correspond to the target values of the position and the posture to be taken by each of the first motion base and the second motion bases, and each of the second motion bases has a virtual mechanical impedance for producing flexibility against the external force;
   a second target value generator that generates final position and posture target values for each of the second motion bases based on the position and posture target values for each of the second motion bases generated by the first target value generator and the degree of displacement of each of the second motion bases computed by the displacement degree computing unit; and
   a controller that controls the first motion base using the position and posture target values for the first motion base generated by the first target value generator, and controls the second motion bases using the final position and posture target values for the second motion bases generated by the second target value generator
   a second target value generator that generates final position and posture target values for each of the second motion bases based on the position and posture target values for each of the second motion bases generated by the first target value generator and the degree of displacement of each of the second motion bases computed by the displacement degree computing unit; and
   a controller that controls the first motion base using the position and posture target values for the first motion base generated by the first target value generator, and controls the second motion bases using the final position and posture target values for the second motion bases generated by the second target value generator.

2. The vehicle test system according to claim 1, wherein:
   each of the external force detectors is configured to detect external forces of respective six degrees of freedom applied to a corresponding one of the second motion bases from the test article installation vehicle body;
   the virtual mechanical impedance of each of the second motion bases is formed of virtual mechanical impedances of respective six degrees of freedom that correspond to the external forces of respective six degrees of freedom; and
   the displacement degree computing unit is configured to compute degrees of six-degree-of-freedom displacements of the second motion bases, which correspond to the external forces of respective six degrees of freedom detected by the external force detectors.

3. The vehicle test system according to claim 2, wherein the virtual mechanical impedances of respective six degrees of freedom include a virtual spring and a virtual damper.

4. The vehicle test system according to claim 3, wherein the test article installation vehicle body is disposed on the movable base of the first motion base and fixed to the movable base of the first motion base.

5. The vehicle test system according to claim 2, wherein the test article installation vehicle body is disposed on the movable base of the first motion base and fixed to the movable base of the first motion base.

6. The vehicle test system according to claim 1, wherein the virtual mechanical impedances of respective six degrees of freedom include a virtual spring and a virtual damper.

7. The vehicle test system according to claim 6, wherein the test article installation vehicle body is disposed on the movable base of the first motion base and fixed to the movable base of the first motion base.

8. The vehicle test system according to claim 1, wherein the test article installation vehicle body is disposed on the movable base of the first motion base and fixed to the movable base of the first motion base.

* * * * *